G. W. LUHRMANN.
DEVICE FOR CONTROLLING PRESSURE PROCESSING.
APPLICATION FILED JAN. 8, 1920.
1,385,631.
Patented July 26, 1921.
2 SHEETS—SHEET 2.
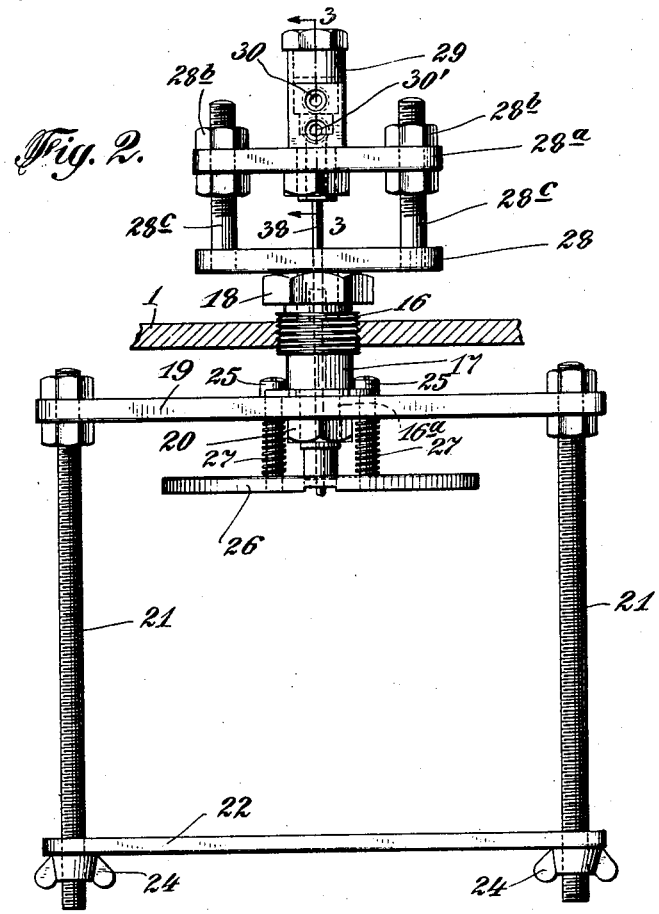
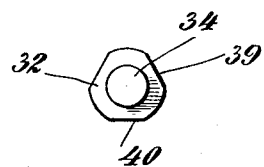
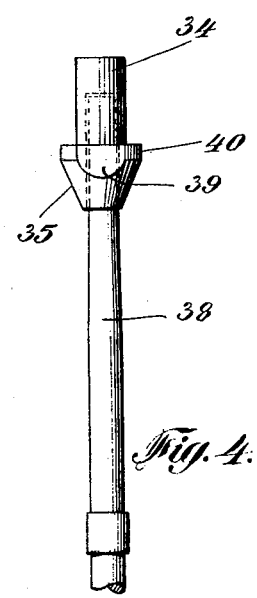
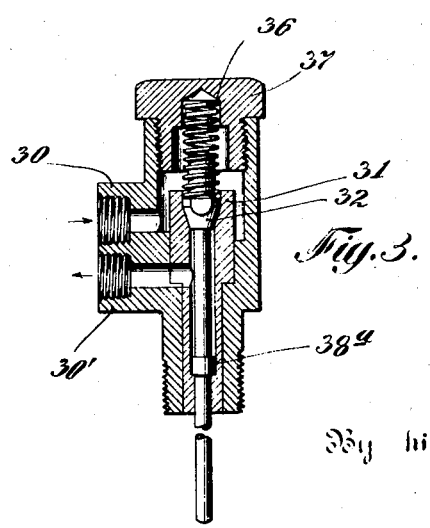
Inventor
George W. Luhrmann
By his Attorney
George Ramsey

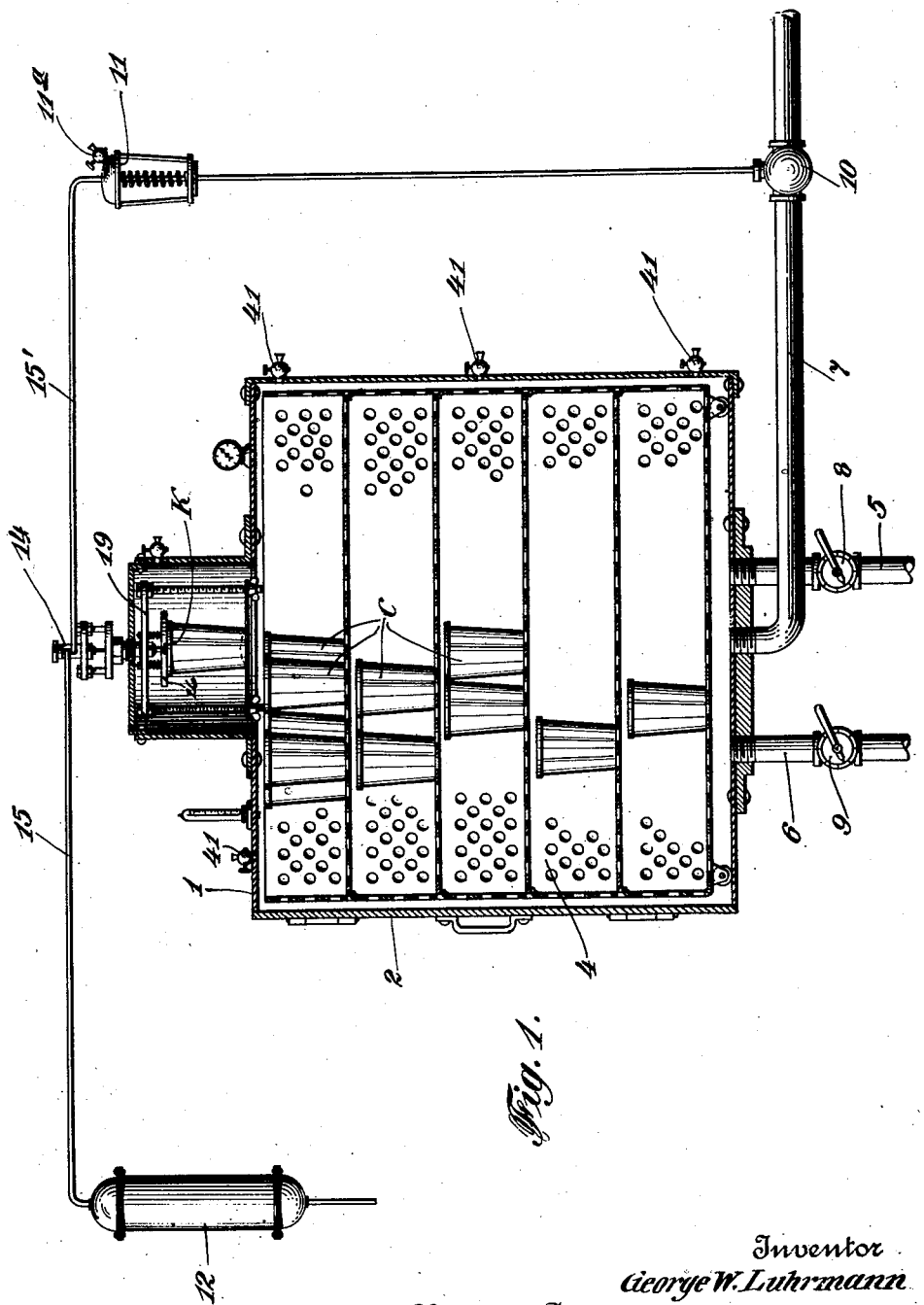

UNITED STATES PATENT OFFICE.

GEORGE W. LUHRMANN, OF JERSEY CITY, NEW JERSEY, ASSIGNOR TO ANCHOR CAP & CLOSURE CORPORATION, OF BROOKLYN, NEW YORK, A CORPORATION OF NEW YORK.

DEVICE FOR CONTROLLING PRESSURE-PROCESSING.

1,385,631.　　　　　Specification of Letters Patent.　　Patented July 26, 1921.

Application filed January 8, 1920. Serial No. 350,238.

*To all whom it may concern:*

Be it known, that I, GEORGE W. LUHRMANN, a citizen of the United States, residing at Jersey City, in the county of Hudson, State of New Jersey, have invented certain new and useful Improvements in Devices for Controlling Pressure-Processing, of which the following is a specification.

This invention relates broadly to preserving, and particularly to apparatus for controlling the application of pressure to packages while they are being subjected to the process of heating and cooling customarily employed in packing perishable materials.

As is well known in the art, it is customary in the packing industry to submit packages of food materials and the like to a sterilizing or a cooking process after the products have been packed and sealed in the containers in which they are to be marketed. Due to the pressures generated within the sealed packages by the sterilizing or cooking heat to which they are subjected, it is customary to apply externally of the packages an equalizing pressure to counterbalance or counteract such internal pressures, for the purpose of preserving the containers against distortion, rupture, or uncapping. The accurate and continuous control of this equalizing or external pressure is highly important for the reason that it requires but an instant of time for the internal pressures to gain a superiority over the external or equalizing pressure sufficient to distort all of the vessels undergoing the processing, or force off their closures.

Various forms of apparatus have been devised for the purpose of rendering this control of the equalizing pressure automatic, and it is to certain improvements in this form of apparatus that my present invention pertains.

An object of the present invention is to provide an automatic control apparatus which is operated by a sealed container or package continuously during the processing of a lot of packages, which controlling or master package is a typical specimen of the packages constituting the lot, and is subjected to all of the influences to which the other packages of the lot are subjected during the processing, concomitantly therewith; and to so construct and arrange such apparatus as to render it easily accessible, strong, and simple in construction, positive and instantaneous in operation, and free from influences which would tend to effect its operation undesirably.

A specific object of the invention is the provision of such a controlling apparatus wherein the operating parts will be free from the direct influences of pressure or heat induced in the processing retort with which it is associated, so that it will be responsive in operation solely and entirely to the contemplated conditions of the master package.

Another specific object is the provision of such an apparatus which is disposed outside of the processing retort and which may be operated by a master package disposed within the retort or within a suitable chamber associated therewith.

A further specific object of the invention is the provision of such a controlling apparatus which is operable differentially to meet different pressure requirements.

A still further object of the invention is the provision of a controlling apparatus of the kind specified which contains certain features of adjustability whereby it is accommodated for uniform operation with packages whose containers are expanded or moved to different extents by the same degree of effective pressure.

Other and further objects of the invention, both general and specific, will be obvious from the following description of an illustrative embodiment thereof, or will be indicated in the appended claims, or ascertainable from the accompanying drawings forming a part of this specification.

In the drawings, Figure 1 represents a diagrammatic illustration of a retort or autoclave adapted for the contemplated preserving process and equipped with a controlling device constituting an embodiment of my invention.

Fig. 2 is a detail in the nature of an elevation showing one form in which my invention may be embodied.

Fig. 3 is a detail in the nature of a sectional elevation taken substantially on line 3—3 of Fig. 2.

Fig. 4 is a detail in the nature of a fragmentary elevational view of the detecting device and controlling valve constituting a part of the embodiment herein disclosed, and Fig. 5 is another detail in the nature of a top or plan view of the part disclosed in Fig. 4.

It will be understood that the apparatus disclosed in these drawings, and now about to be described, is one of a variety of forms in which my invention may be embodied, and is here given for the purpose of disclosure and illustration only, and that it may be departed from materially as to details, features of construction, and form, without sacrificing the essentials of the invention or departing from the intended scope of the appended claims, which are intended to comprehend all structures in which the invention may be embodied.

As identified by reference characters, it will be understood that the illustrated apparatus includes a retort or autoclave 1 of suitable construction and form for the practice of the contemplated preserving process. This retort is closed by a suitable door or cover 2 which is removable to permit the placing of packages in the retort and their removal therefrom.

Packages may be disposed in the retort in any suitable manner, either by being stacked therein or by being placed in a suitable basket or charging container 4 which is movable into and out of the retort. The packages designated by the character C are illustrative of a charge or a lot of packages undergoing the processing. The retort is equipped with means for the introduction of heat into effective association with the packages,—in the present instance the pipe 5 illustrating such means, and constituting an arrangement whereby hot steam may be introduced into the retort. The retort is also equipped for the introduction thereinto of a cooling medium which will be effective to extract heat from the packages at the completion of the cooking or sterilizing process. Such a means is illustrated by the water pipe 6 through which water may be introduced into the retort.

Pipe 7 is illustrative of means whereby fluid pressure may be induced in the retort so as to be effective externally upon the vessels comprising the containers of the packages. In the present instance the pipe 7 may be understood as being a conduit for compressed air or the like leading from a suitable source such as a storage tank or compressor. It will be understood, furthermore, that the invention is not limited to any particular disposal or relationship of the means for supplying the heat, the cooling and the pressure fluids, as it may be desirable in instances to arrange them so that the pressure fluid may be subjected to the heat before introduction into the retort, or so that the cooling fluid may be subjected to the heat before reaching the retort. Suitable controlling devices are arranged for regulating the supply of the several fluids, the controlling means for the heat being represented by the valve 8, that for the cooling fluid by the valve 9, and that for the pressure fluid by the valve 10.

The valve 10 is designed to be operated by a suitable spring and fluid pressure operated motor device 11. In the illustrative embodiment this motor device is arranged to be actuated by fluid pressure from a source 12, which is led to the device 11 through a suitable controlling device 14 by means of the connecting lines 15 and 15'.

An illustrative construction of the device 14 together with its associated and appurtenant parts comprising portions of the controlling apparatus will be understood by reference to Figs. 2 to 5 inclusive. A wall of the retort 1 is apertured at a proper place and in said aperture is positioned a bushing 16 having a longitudinal bore or channel-way 17. Said bushing may be headed at its upper end, as at 18, to facilitate its being screwed into the supporting wall, or it may be otherwise secured in place. Adjacent the lower extremity of the bushing 16 may be secured a transversely extending plate 19 mounted on the reduced extension 16ª and retained by the nut 20. The plate 19 carries depending members 21 which may be in the nature of rods, and which carry the bottom plate 22, movable on said rods toward and from the plate 19 and having its position determined by the adjustable nuts 24. The plate 19 furnishes support for a pair of guide studs 25 slidably movable therein, which carry at their lower extremities a pressure plate 26. Said pressure plate is apertured so as to be movable longitudinally of the lower extremity of the bushing 16, and is urged to its lowermost position by the extension springs 27 interposed between plates 19 and 26 on the studs 25.

Mounted on the upper extremity of bushing 16 is a frame 28 provided with a channel registering with the longitudinal bore 17 of the bushing, and including a portion 28ª providing a support for the valve casing 29. The member 28ª is adjustable toward and from the member 28 by means of the nuts 28ᵇ threaded on the stud screws 28ᶜ, which are mounted in the member 28. This permits the valve casing 29 being selectively positioned longitudinally relative to the bushing 16, which arrangement is of particular utility for the reasons hereinafter indicated. Valve casing 29 is provided with connection ports 30 and 30' for attachment respectively with the pressure lines 15 and 15'. Said valve casing houses the valve seat 31 (see Fig. 3) interposed between the ports 30 and 30', with which seat coöperates the control valve 32. As will be seen in Fig. 4, this valve is in the form of a thimble having the conjoined upwardly extending stud 34 and the conical portion 35, which latter coöperates with the valve seat. Upon the stud 34 and against the shoulder formed by the upper extremity of the conical portion is mounted an extension spring 36 which is retained by the screw cap 37 and operates to maintain the valve normally seated. The valve is loosely mounted upon the upper end of a detecting element 38 which operates as a tappet rod or stem for the valve. Said detecting element 38 occupies the bore 17 with its lower extremity extending beyond the lower extremity of the bushing 16. The detecting element has free longitudinal movement within the bore in which it is mounted, and is retained against falling downwardly out of said bore by the shoulder 38$^a$ occupying the enlarged channel-way in the downward extension of the element forming the valve seat 31. As seen in Figs. 4 and 5, the conical portion 35 of the valve is planed off for a portion of its height as at 39 to provide discharge passages between the cylindrical portion 40 of the valve and the cylindrical portion of the valve seat. Upward movement of the detecting element 38 will unseat the valve, first sufficiently to clear the conical portion 35 without clearing the entire cylindrical portion 40, permitting the limited escape of pressure fluid from line 15 to line 15′ through the restricted ports provided by the planed off portions 39. A further upward movement of the detecting device 38 will clear the cylindrical portion 40 of the valve from the cylindrical portion of the valve seat, and permit the escape of pressure fluid from line 15 to the line 15′ in ratio to the extent to which the valve 32 is unseated. Relief of the operating pressure on detecting device 38 will permit the valve 32 being seated under the influence of the spring 36. Due to the loose connection with the detecting device 38 the valve will accommodate itself accurately to the seat 31 under the pressure of the spring 36 so as always to close entirely when seated. The adjustability of the valve casing 29 by means of the nuts 28$^b$ permits a variation in the position of the valve relative to the detecting member 38, so that the latter may be rendered capable of a certain extent of lost motion before its upper extremity becomes effective within the extension 34 to cause the unseating of the valve.

In the use of the apparatus, it will be understood that, the retort being properly charged with packages to be processed, and a typical master package having been mounted between the members 22 and 26 with a flexible portion of its wall, such as its top or cap K in operative association with the lower extremity of the detecting element 38, the proper cooking or sterilizing temperature is induced in the retort by the admission of heating fluid about the packages. The specimen package is subjected to the heat concomitantly with the other packages of the lot, and it will experience such changes in internal pressures as do the other packages in the lot. Upon such internal pressure reaching a point where it is effective to expand or move outwardly a flexible portion of the container wall such as the cap K, the movement resulting from such flection of the container wall will be transmitted to the detecting device 38 and by it in turn to the valve 32, with the result that the valve will be unseated and operating pressure admitted to the motor device 11. Such pressure being rendered effective upon the motor device 11, the operation of the latter will open the valve 10 to admit fluid pressure into the retort 1. The admission of such fluid pressure will be continued to the point where the pressure in the retort externally of the packages is built up to a point sufficient to counteract the internal pressures in the packages, and force expanded or outwardly displaced portions of the container walls back to their normal position. This effect having been induced in the specimen container, the operating pressure of its wall upon the detecting device 38 will be relieved and the valve 32 permitted to seat. This, of course, will cut off the operating pressure fluid from the motor device 11, and the latter, being vented through the adjustable port 11$^a$, will effect an immediate closing of the valve 10 to cut off the further supply of pressure fluid to the retort. It will be understood that during the heating process the retort is being constantly vented or bled through suitable vent cocks 41 to permit the displacement of the cooled heating fluid by the incoming heating fluid, and it will also be understood that automatic means may be arranged for the relief of excess pressure within the retort beyond a predetermined maximum. It will be obvious, therefore, that from the causes above mentioned, and from other causes, such as reduction of temperature within the retort as by a drop in the steam pressure, the pressure controlling device may be called into operation intermittently or at varying intervals during the heating process. At the end of the heating process, it becomes necessary to cool the packages before their removal from the retort, else the internal pressures induced in them would distort them or blow off their caps. In order to operate efficiently it is customary to induce this cooling artificially by the circulation of a cooling medium in the retort about the packages. It is obvious that the introduction of this cooling medium will cause an immediate drop in the pressure in the retort, necessitating an immediate restoration of the equalizing pressure in order to counterbalance the internal pressures. The pressure controlling device is effective at this time as well as at the time of the application of the heat, so that, immediately a reduction of exterior pressure is manifested by the internal pressure of the master package becoming effective to move the flexible portion of the container, the device will be operated as above described to maintain the proper counterbalance upon the exterior of the packages.

It will be understood, of course, that this device is designed for use with a great variety of sizes of packages. The packages which are usually subjected to this sort of processing customarily are sealed under vacuum so that flexible portions of the containers, such as the metal caps with which the vessel are sealed, are rendered slightly concave by the atmospheric pressure. The extent of this concavity will be greater in vessels whose closures have a comparatively large area than vessels whose closures have a smaller area, and consequently the movement of such flexible portions in expansion by internal pressure will be greater in actual extent in some packages than it will be others. Inasmuch as it is desirable to maintain the external or equalizing pressure at the smallest amount effective, and inasmuch as the original concavity of the flexible portion of the package allows a certain amount of movement or expansion before the internal pressures will become effective to force the closure, it may not be desirable to apply the equalizing pressure until the flexible portion of the container has started to expand beyond the normal position,—that is, beyond the position occupied after the concavity formed by the atmospheric pressure has been flattened out. The adjustability of the valve casing 29, and with it the valve 31, relative to the detecting member 38, allows for the device being accommodated to different packages whose wall portions permit movement of different extent.

The apparatus as thus organized contains very distinct advantages. In the first place the essential regulating element, illustrated as the controlling valve, is disposed exteriorly of the retort and therefore is not subject to direct pressure influences, or to the influence of the high temperature in the retort. This arrangement of the controlling device precludes its becoming filled with water of condensation or by the water utilized as a cooling fluid in the retort, and also places it out of the reach of refuse material which would foul it, and which is almost always present in apparatus of this description due to the bursting or leaking of packages in the retort or the washing off from them of material spilled on them during the filling operation. At the same time, it is operable by a container within the retort through the instrumentality of a detecting element. The arrangement of the valve is such that any escape of pressure from the retort through the channel of the detecting element is vented to the atmosphere without being permitted access to the valve chamber. The employment of a regulating valve which is differentially operable to control the supply of operating pressure in different quantities in conjunction with the use of the variable venting arrangement 11ª for the pressure operated motor device provides an apparatus which operates with extreme nicety to supply the requisite amount of equalizing pressure to the retort without imposing upon it the sudden and radical jump in pressure which would be occasioned by admitting the entire pressure carried at the fluid pressure source. The apparatus as constructed is simple and compact and very strong, and therefore, extremely reliable in operation. Moreover, its disposal is such that it is not subject to injury in the operation of the retort. It is obvious that it is susceptible to use not only for the control of the fluid pressure, but also for control of supply of heating fluid or cooling fluid, or the discharge of fluid from the retort.

Having thus described my invention, what I claim is:

1. An apparatus for controlling processing, comprising a receptacle adapted to inclose a package, means for applying heat to a package so inclosed, means for applying pressure externally to such package to counteract pressures developed therein by the heat, a controlling device disposed externally of the receptacle and operable to regulate the pressure applied to the package and means operable by a sealed package within the receptacle and effective upon the controlling device.

2. An apparatus for controlling processing, comprising a receptacle adapted to inclose a package, means for applying fluid to a package so inclosed, a controlling device disposed externally of the receptacle and operable to regulate the supply of fluid applied to the package, and means operable by a sealed package within the receptacle and effective upon the controlling device.

3. In a processing apparatus, the combination of a receptacle for the reception of packages, means for applying heat to packages within the receptacle, means for applying pressure externally to packages within the receptacle, a controlling device disposed externally of the receptacle for controlling the application of pressure to the packages, and means operable by a wall portion of a package within the receptacle to effect the operation of the controlling device.

4. In a processing apparatus, the combination of a receptacle for the reception of packages, means for supplying fluid to packages within the receptacle, a controlling device disposed externally of the receptacle for controlling the supply of fluid to the packages, and means operable by a wall portion of a package within the receptacle to effect the operation of the controlling device.

5. In a processing apparatus, the combination of a retort for the reception of a lot of packages, means within the retort for supporting a specimen package, means for applying heat to packages within the retort, means for inducing pressure exteriorly upon packages within the retort, a controlling device outside the retort for regulating the operation of said last mentioned means, and a detecting element operable by a wall portion of the specimen package and effective upon the controlling device.

6. In a processing apparatus, the combination of a retort for the reception of a lot of packages, means within the retort for supporting a specimen package, means for applying fluid to packages within the retort, a controlling device outside the retort for regulating the operation of said last mentioned means, and a detecting element operable by a wall portion of the specimen package and effective upon the controlling device.

7. In a processing apparatus, the combination of a retort for the reception of packages, means for applying heat to packages within the retort, means for applying pressure externally to packages within the retort, a controlling device operable by a package within the retort and effective to regulate the application of pressure to packages therein, said controlling device being arranged to preclude the transmission thereto of pressures induced within the retort.

8. In a processing apparatus, the combination of a retort for the reception of packages, means for applying pressure externally to packages within the retort, a controlling device operable by a package within the retort and effective to regulate the application of pressure to packages therein, said controlling device being arranged to preclude the transmission thereto of pressures induced within the retort.

9. In a processing apparatus, the combination of a retort arranged for the reception of packages, means for applying heat to packages within the retort, means for supplying fluid pressure into the retort, and a controlling device operable by a sealed package within the retort for controlling the operation of the last mentioned means, said controlling device being arranged to preclude the transmission thereto of fluid pressure from the retort.

10. In a processing apparatus, the combination of a retort arranged for the reception of packages, means for supplying fluid pressure into the retort to affect the packages, and a controlling device operable by a sealed package within the retort for controlling the operation of the last mentioned means, said controlling device being arranged to preclude the transmission thereto of fluid pressure from the retort.

11. In a processing apparatus, the combination of a receptacle for a package, means for applying heat to a package within the receptacle, means for supplying pressure fluid into the receptacle, and a controlling device operable by the container of a package within the receptacle for controlling said last mentioned means; said controlling device being arranged to preclude the transmission thereto of pressure fluid from the receptacle.

12. In a processing apparatus, the combination of a receptacle for a package, means for supplying fluid into the receptacle, and a controlling device operable by movement of a portion of a package within the receptacle for controlling said last mentioned means; said controlling device being arranged to preclude the transmission thereto of fluid from the receptacle.

13. In a processing apparatus, the combination of a retort for the reception of packages, means for applying heat to packages within the retort, means for supplying pressure fluid into the retort, a detecting element movable by a package within the retort, and a controlling device for the pressure fluid supply disposed outside the retort, said controlling device being operable by the detecting element.

14. In a processing apparatus, the combination of a retort for the reception of packages, means for inducing pressure in the retort, a detecting element movable by a package within the retort, and a controlling device for the pressure inducing means disposed outside the retort, said controlling device being operable by the detecting element.

15. In a processing apparatus, the combination of a receptacle for a package, means for supplying heat to a package within said receptacle, means for introducing pressure fluid into the receptacle, a controlling device for said last mentioned means disposed exteriorly of the receptacle, and a detecting device movable by the wall of a package within the receptacle for operating the controlling device.

16. In a processing apparatus, the combination of a receptacle for a package, means for introducing fluid into the receptacle, a controlling device for said last mentioned means disposed exteriorly of the receptacle, and a detecting device movable by the wall of a package within the receptacle for operating the controlling device.

17. In a processing apparatus, in combination with a retort, a pressure operated device disposed outside the retort, a movable detecting member operable inside the retort for controlling the operation of the pressure operated device, means for sustaining a package within the retort in operative association with the detecting member, and means for inducing opposing influences upon a package so supported.

18. In a processing apparatus, in combination with a receptacle for a package, a pressure operated device disposed outside said receptacle, a movable detecting member operable inside the receptacle for controlling the operation of the pressure operated device, means for sustaining a package within the receptacle in operative association with the detecting member, and means for inducing opposing pressure influences upon a package so supported.

19. In a processing apparatus, in combination with a retort, a pressure operated device disposed outside the retort, a movable detecting member operable inside the retort for controlling the operation of the pressure operated device, means for sustaining a package within the retort in operative association with the detecting member, and processing means for inducing opposing influences upon a package so supported, one of said processing means being under the control of the pressure operated device.

20. In a processing apparatus, in combination with a retort, a pressure operated device disposed outside the retort, a movable detecting member operable inside the retort for controlling the operation of the pressure operated device, and means for sustaining a package within the retort in operative association with the detecting member.

21. In a processing apparatus, the combination of a receptacle for a package, a rod extending through a wall of the receptacle for operative association with a package therein, a controlling device outside the receptacle having operative association with said rod, and means under the control of said controlling device for inducing pressure within the receptacle.

22. In a processing apparatus, the combination of a receptacle for a package, fluid supply means therefor, a rod extending through the wall of the receptacle for operative association with a package therein, and a controlling device outside the receptacle having operative association with said rod, said controlling device being effective upon the fluid supply means.

23. In a processing apparatus, the combination of a receptacle for a package, a rod extending through the wall of the receptacle for operative association with a package therein, a controlling device outside the receptacle having operative association with said rod, and means controlled by said controlling device for affecting a package in the receptacle.

24. In a processing apparatus, the combination of a receptacle, a rod extending through the wall of the receptacle, a controlling device outside the receptacle having operative association with said rod, a package within the receptacle having operative association with the rod, and means controlled by said controlling device and effective upon the package.

25. In a processing apparatus, the combination of a retort for the reception of packages, means for applying fluid to packages within the retort, a controlling device mounted outside the retort for regulating the operation of said last mentioned means, said controlling device being operable to effect variation in the application of fluid to the packages, and a detecting element operable by a wall portion of a package within the retort for actuating the controlling device.

26. In a processing apparatus, the combination of a receptacle for a package, means for supplying fluid to a package within the receptacle, a controlling device for regulating the operation of said last mentioned means, and a detecting element operable by a wall portion of a package in the receptacle, said detecting element having movement effective upon the controlling device and movement independently thereof.

27. In a processing apparatus, the combination of a receptacle for a package, means for applying fluid to a package within the receptacle, a detecting element operable by a package within the receptacle, and a controlling device operable by the detecting element for controlling the application of fluid, said controlling device being adjustable to vary the effectiveness of the detecting element thereon.

28. In a processing apparatus, the combination of a receptacle for a package, means for applying fluid to a package within the receptacle, a detecting element operable by a wall portion of a package within the receptacle, and a pressure operated controlling device for regulating the application of fluid, said controlling device being adjustable to vary the effectiveness of the detecting element thereon.

29. In a processing apparatus, the combination of a receptacle for a package, means for applying fluid to a package within the receptacle, a pressure operated controlling device for regulating the operation of said last mentioned means, a detecting element operable by a package within the receptacle and effective upon the controlling device, and means for effecting relative adjustment of the controlling device and detecting element to vary the effectiveness of the latter upon the former.

30. In a processing apparatus, the combination of a receptacle for a package, means for applying fluid to a package within the receptacle, a controlling device for regulating the operation of said last mentioned means, a detecting element movable by a package within the receptacle and effective upon the controlling device, and means for varying the effective extent of movement of the detecting element.

31. In a processing apparatus, the combination of a receptacle for a package, means for applying fluid to a package within the receptacle, a valve mounted outside of the receptacle and controlling the application of fluid, and a detecting element effective upon the valve and movable relative thereto by a package within the receptacle.

32. In a processing apparatus, the combination of a receptacle for a package, means for applying fluid to a package within the receptacle, a variably effective valve controlling the application of fluid, said valve being mounted in such manner as to be unaffected by the pressure in the receptacle, and a detecting element movable by a package and effective upon the valve.

GEORGE W. LUHRMANN.